(12) United States Patent
Morganti et al.

(10) Patent No.: US 10,161,260 B2
(45) Date of Patent: Dec. 25, 2018

(54) VANE LEVER ARM FOR A VARIABLE AREA VANE ARRANGEMENT

(71) Applicant: United Technologies Corporation, Hartford, CT (US)

(72) Inventors: Nicholas G. Morganti, Durham, CT (US); Bernard W. Pudvah, Portland, CT (US); Christopher R. Osborne, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 716 days.

(21) Appl. No.: 14/761,827

(22) PCT Filed: Jan. 17, 2013

(86) PCT No.: PCT/US2013/021941
§ 371 (c)(1),
(2) Date: Jul. 17, 2015

(87) PCT Pub. No.: WO2014/113010
PCT Pub. Date: Jul. 24, 2014

(65) Prior Publication Data
US 2015/0354401 A1  Dec. 10, 2015

(51) Int. Cl.
*F01D 17/16* (2006.01)
*F02C 7/36* (2006.01)
*F04D 29/56* (2006.01)

(52) U.S. Cl.
CPC .............. *F01D 17/162* (2013.01); *F02C 7/36* (2013.01); *F04D 29/563* (2013.01); *F05D 2260/30* (2013.01); *F05D 2260/36* (2013.01); *F05D 2260/50* (2013.01)

(58) Field of Classification Search
CPC ........ F01D 17/162; F01D 17/00; F01D 17/16; F01D 17/165; F02C 7/36; F05D 2260/30; F05D 2260/36; F05D 2260/50; F05D 2260/79
USPC .............................. 415/140, 156, 160, 124.1
See application file for complete search history.

(56) References Cited

U.S. PATENT DOCUMENTS

| | | | |
|---|---|---|---|
| 4,295,784 A | 10/1981 | Manning | |
| 4,363,600 A | 12/1982 | Thebert | |
| 4,720,237 A | 1/1988 | Weiner et al. | |
| 4,767,264 A | 8/1988 | Kisling et al. | |
| 5,492,446 A | 2/1996 | Hawkins et al. | |
| 6,209,198 B1 | 4/2001 | Lammas et al. | |
| 6,984,104 B2 | 1/2006 | Alexander et al. | |
| 7,011,494 B2 | 3/2006 | Kies et al. | |

(Continued)

FOREIGN PATENT DOCUMENTS

FR  2877059  4/2006

OTHER PUBLICATIONS

EP Search Report dated Jan. 22, 2016.

*Primary Examiner* — Mark Laurenzi
*Assistant Examiner* — Mickey France
(74) *Attorney, Agent, or Firm* — O'Shea Getz P.C.

(57) ABSTRACT

A variable area vane arrangement includes a stator vane including a shaft having an axis. The vane arrangement also includes a vane lever arm that rotates the stator vane about the axis. The vane lever arm includes a base, a first tab and a second tab. The base is arranged laterally between the first tab and the second tab. The first tab laterally overlaps the base. The second tab includes an aperture and laterally overlaps the base and the first tab. The shaft extends through the aperture and is connected to the base.

18 Claims, 6 Drawing Sheets

(56) References Cited

U.S. PATENT DOCUMENTS

| | | |
|---|---|---|
| 7,278,819 B2 | 10/2007 | Schilling |
| 7,448,848 B2 | 11/2008 | Alexander et al. |
| 8,052,484 B1 | 11/2011 | Salisbury et al. |
| 8,202,043 B2 | 6/2012 | McCaffrey |
| 8,215,902 B2 | 7/2012 | Major et al. |
| 2005/0169741 A1 | 8/2005 | Kies et al. |
| 2005/0265824 A1 | 12/2005 | Alexander et al. |
| 2010/0092278 A1 | 4/2010 | Major et al. |
| 2012/0251297 A1 | 10/2012 | Major et al. |

VANE LEVER ARM FOR A VARIABLE AREA VANE ARRANGEMENT

This application claims priority to PCT Patent Application No. PCT/US13/21941 filed Jan. 17, 2013, which is hereby incorporated by reference.

BACKGROUND OF THE INVENTION

1. Technical Field

This disclosure relates generally to rotational equipment and, more particularly, to a vane lever arm for a variable area vane arrangement of, for example, a turbine engine.

2. Background Information

A typical turbine engine includes a plurality of engine sections such as, for example, a fan section, a compressor section, a combustor section and a turbine section. The turbine engine may also include a variable area vane arrangement. Such a vane arrangement may be configured to guide and/or adjust the flow of gas into a respective one of the engine sections. Alternatively, the vane arrangement may be configured to guide and/or adjust the flow of gas between adjacent stages of a respective one of the engine sections.

A typical variable area vane arrangement includes a plurality of adjustable stator vanes that are rotatably connected to an inner vane platform and an outer vane platform. Each of the stator vanes includes an airfoil that extends between the inner and the outer vane platforms. Each of the stator vanes may be rotated about a respective axis using a vane lever arm. Various types of vane lever arms are known in the art including vane lever arms constructed from sheet metal. Some sheet metal vane lever arms, however, may fail when the stator vane is subject to a surge force; e.g., a force caused by a foreign object such as a bird, or a blade out.

There is a need in the art for an improved vane lever arm.

SUMMARY OF THE DISCLOSURE

According to an aspect of the invention, a variable area vane arrangement is provided that includes a stator vane including a shaft having an axis. The vane arrangement also includes a vane lever arm that rotates the stator vane about the axis. The vane lever arm includes a base, a first tab and a second tab. The base is arranged laterally between the first tab and the second tab. The first tab laterally overlaps the base. The second tab includes an aperture and laterally overlaps the base and the first tab. The shaft extends through the aperture and is connected to the base.

According to another aspect of the invention, another variable area vane arrangement is provided that includes a stator vane including a shaft having an axis. The vane arrangement also includes a vane lever arm that rotates the stator vane about the axis. The vane lever arm includes a base, a first tab and a second tab. The base is arranged between the first tab and the second tab. The first tab extends from the base to a first anti-rotation element. The second tab includes an aperture and a second anti-rotation element that partially defines the aperture. The shaft extends through the aperture, is connected to the base, and is arranged between the first anti-rotation element and the second anti-rotation element.

According to still another aspect of the invention, a turbine engine is provided that includes a plurality of engine sections arranged along a first axis, and a variable area vane arrangement directing gas for one of the engine sections. The engine sections include a compressor section, a combustor section and a turbine section. The vane arrangement includes a stator vane including a shaft having a second axis. The vane arrangement also includes a vane lever arm that rotates the stator vane about the second axis. The vane lever arm includes a base, a first tab and a second tab. The base is arranged between the first tab and the second tab. The first tab laterally overlaps the base. The second tab includes an aperture and laterally overlaps the base and the first tab. The shaft extends through the aperture and is connected to the base.

The vane lever arm may include an arm portion that extends substantially longitudinally from the base.

The first tab may be located adjacent the shaft.

The first tab may overlap the aperture.

The first tab may extend from the base to a first anti-rotation element. The second tab may include a second anti-rotation element that partially defines the aperture. The shaft may be arranged between, and may engage the first anti-rotation element and the second anti-rotation element.

The second tab may include a third anti-rotation element that partially defines the aperture. The third anti-rotation element may be separated from the shaft by a gap during a first mode of operation, and may engage the shaft during a second mode of operation. The shaft may be arranged between the second anti-rotation element and the third anti-rotation element.

The first anti-rotation element may be configured as a substantially planar surface that contacts a substantially planar surface of the shaft.

The second anti-rotation element may be configured as a substantially planar surface that contacts a substantially planar surface of the shaft.

The first tab and/or the second tab may each include an intermediate portion and an end portion. The intermediate portion may extend between the base and the end portion. The end portion may overlap the base. The intermediate portion may be curved, and the end portion may be substantially planar.

The base may include a second aperture. The shaft may extend through the second aperture.

The vane arrangement may include a vane platform with a second aperture. The stator vane may include a turbine engine airfoil. The shaft may extend from the airfoil, through the second aperture, to the vane lever arm.

The first tab may overlap the base. The second tab may overlap the base and the first tab. The first tab may also overlap the aperture.

The turbine engine may include a gear train that connects a rotor in a first of the engine sections to a rotor in a second of the engine sections.

The foregoing features and the operation of the invention will become more apparent in light of the following description and the accompanying drawings.

DETAILED DESCRIPTION OF THE INVENTION

Figure 1:
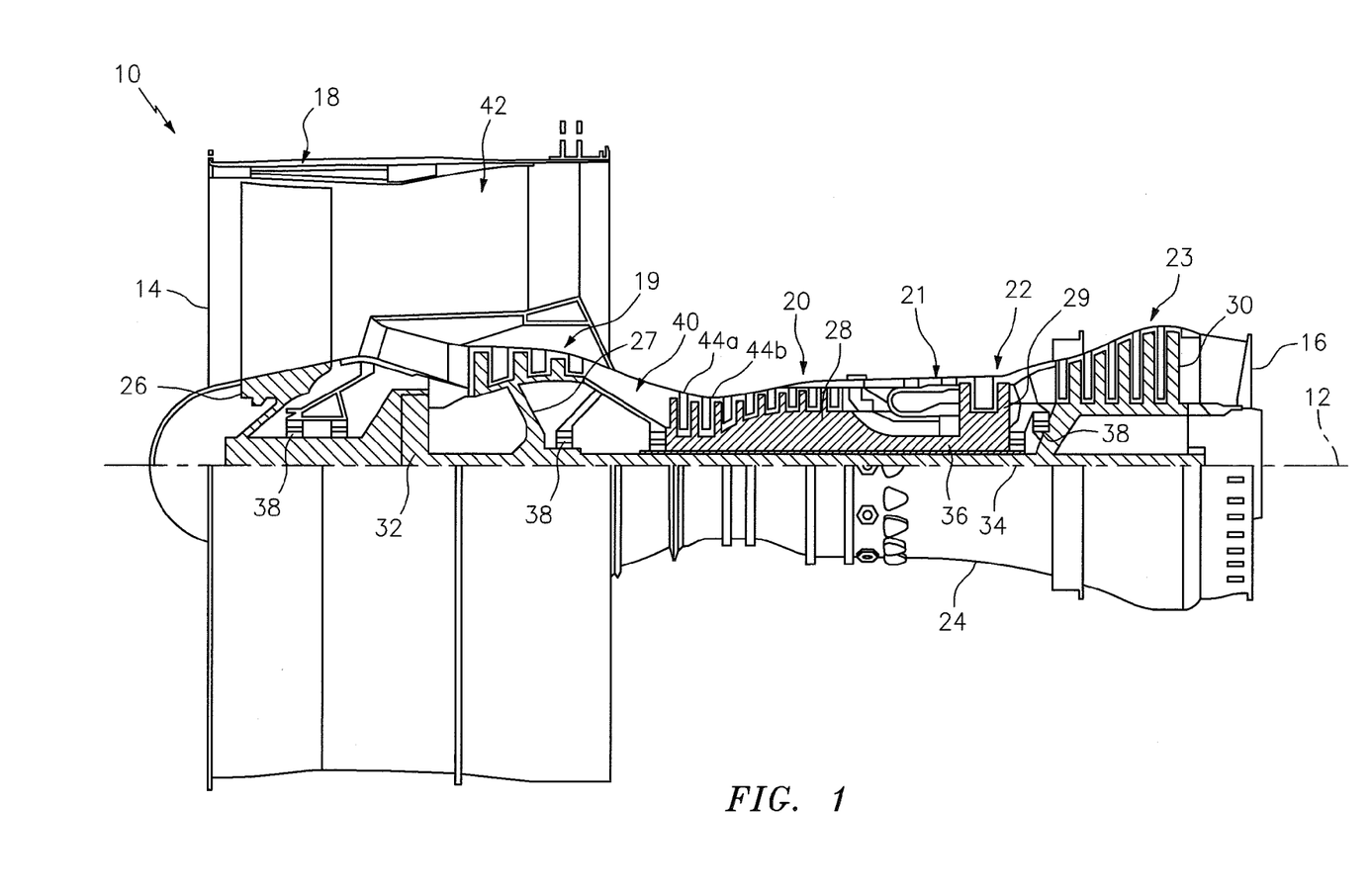
FIG. 1 is a side cutaway illustration of a geared turbine engine.

FIG. 1 is a side cutaway illustration of a geared turbine engine 10 that extends along an axis 12 between a forward airflow inlet 14 and an aft airflow exhaust 16. The engine 10 includes a fan section 18, a low pressure compressor (LPC) section 19, a high pressure compressor (HPC) section 20, a combustor section 21, a high pressure turbine (HPT) section 22, and a low pressure turbine (LPT) section 23. These engine sections 18-23 are arranged sequentially along the axis 12 and housed within an engine case 24.

Each of the engine sections 18-20, 22 and 23 includes a respective rotor 26-30. Each of the rotors 26-30 includes a plurality of rotor blades arranged circumferentially around and connected (e.g., mechanically fastened, welded, brazed or otherwise adhered) to one or more respective rotor disks. The fan rotor 26 is connected to a gear train 32. The gear train 32 and the LPC rotor 27 are connected to and driven by the LPT rotor 30 through a low speed shaft 34. The HPC rotor 28 is connected to and driven by the HPT rotor 29 through a high speed shaft 36. The low and high speed shafts 34 and 36 are rotatably supported by a plurality of bearings 38. Each of the bearings 38 is connected to the engine case 24 by at least one stator such as, for example, an annular support strut.

Air enters the engine 10 through the airflow inlet 14, and is directed through the fan section 18 and into an annular core gas path 40 and an annular bypass gas path 42. The air within the core gas path 40 may be referred to as "core air". The air within the bypass gas path 42 may be referred to as "bypass air" or "cooling air". The core air is directed through the engine sections 19-23 and exits the engine 10 through the airflow exhaust 16. Within the combustion section 21, fuel is injected into and mixed with the core air and ignited to provide forward engine thrust. The bypass air is directed through the bypass gas path 42 and out of the engine 10 to provide additional forward engine thrust or reverse thrust via a thrust reverser. The bypass air may also be utilized to cool various turbine engine components within one or more of the engine sections 19-23.

Figure 2:
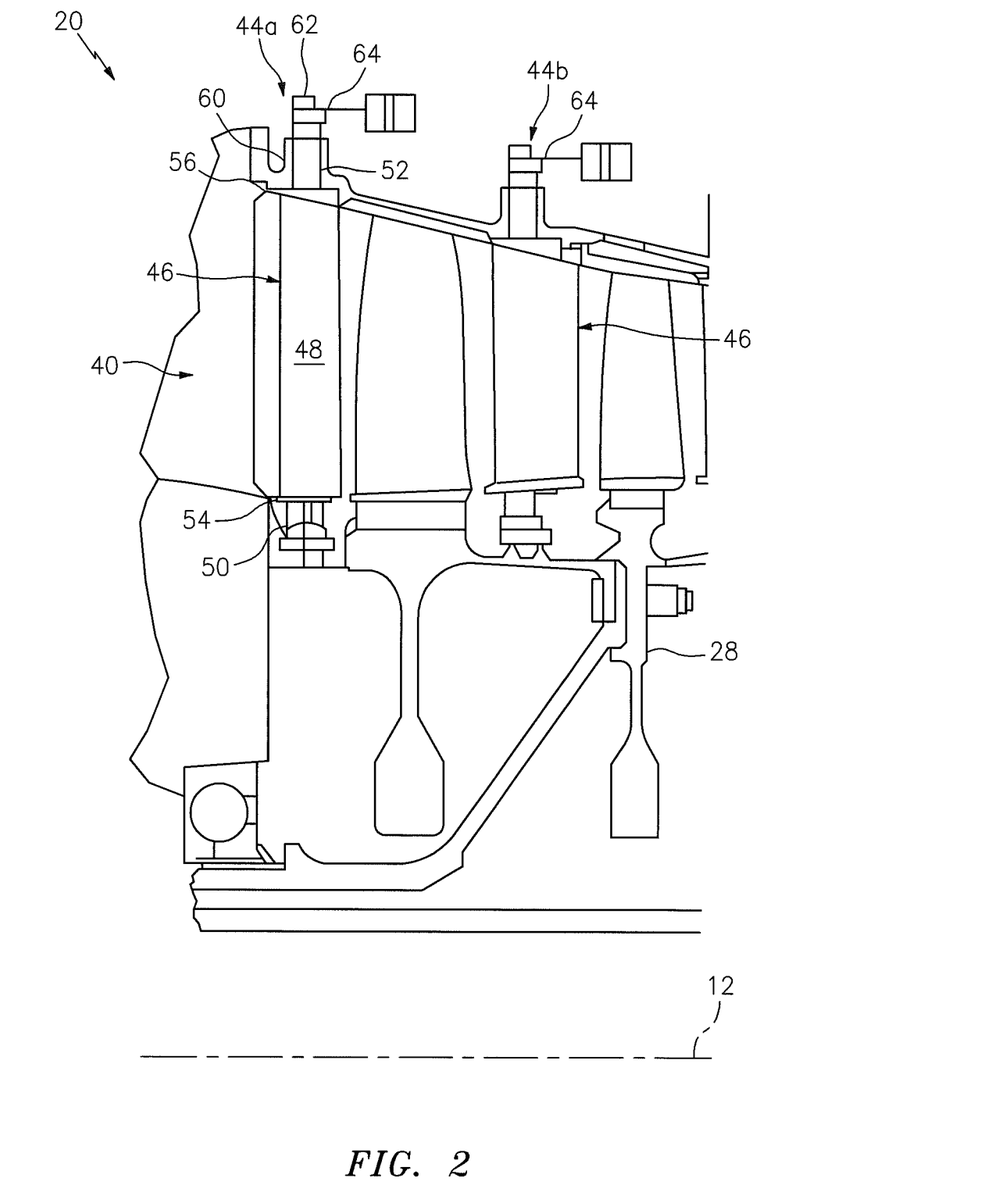
FIG. 2 is a partial, side sectional illustration of a compressor section with a plurality of variable area vane arrangements.

Referring still to FIG. 1, the engine 10 also includes one or more variable area vane arrangements; e.g., vane arrangements 44a, 44b, etc. Each of the vane arrangements directs gas for a respective one of the engine sections 18-20, 22 and 23. Referring to FIG. 2, for example, the vane arrangement 44a guides and/or adjusts the flow of the core air into the HPC section 20. The vane arrangement 44b guides and/or adjusts the flow of the core air through the HPC section 20; e.g., between adjacent HPC rotor stages.

Each of the vane arrangements (e.g., 44a and 44b) includes one or more adjustable stator vanes 46 that are arranged circumferentially around the axis 12. Each of the stator vanes 46 includes a turbine engine airfoil 48 and one or more coaxial vane shafts; e.g., a vane inner shaft 50 and a vane outer shaft 52. The airfoil 48 of FIG. 2 extends through the core gas path 40 between an annular inner vane platform 54 and an annular outer vane platform 56. The airfoil 48 is arranged between the inner and the outer shafts 50 and 52, which extend along an axis 58 (see FIG. 3). The inner shaft 50 extends from the airfoil 48 into the inner vane platform 54, and is rotatably connected to the inner vane platform 54. The outer shaft 52 extends from the airfoil 48, through an aperture 60 in the outer vane platform 56, to an outer vane end 62. The outer shaft 52 is rotatably connected to the outer vane platform 56.

Figure 3:
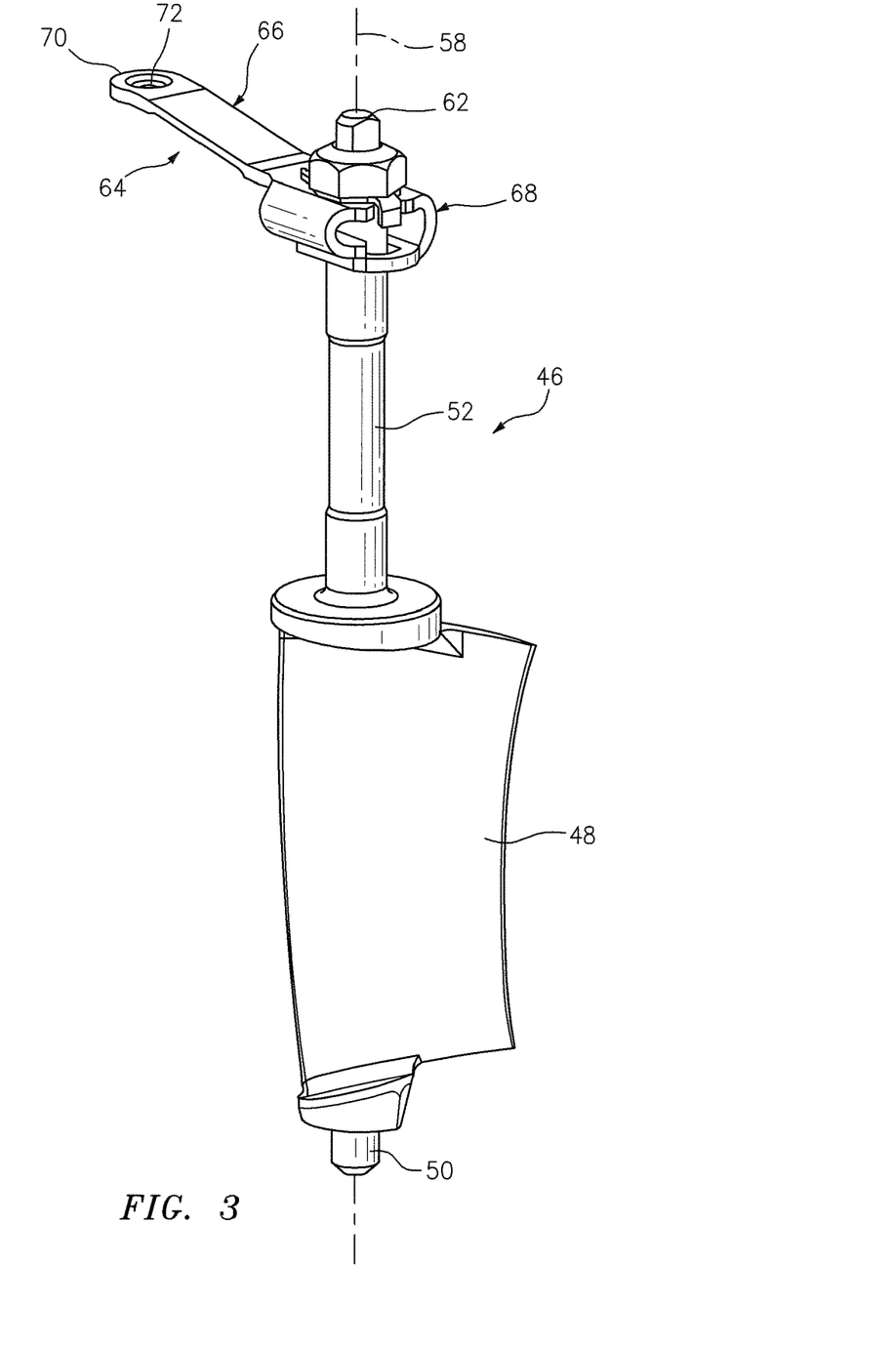
FIG. 3 is a perspective illustration of a vane lever arm connected to an adjustable stator vane for a variable area vane arrangement.

Referring to FIG. 3, each of the stator vanes 46 may be rotated about its respective axis 58 by pivoting a respective vane lever arm 64 about the axis 58 with an actuator (not shown). Now referring to FIGS. 4 to 6, the vane lever arm 64 includes an arm portion 66 and a mount portion 68. The arm portion 66 extends longitudinally (e.g., along a radial x axis) from the mount portion 68 to a distal arm end 70. The arm portion 66 includes an aperture 72 arranged at (e.g., proximate, adjacent or on) the arm end 70. A pin (not shown) may extend through the aperture 72 to connect the vane lever arm 64 to the actuator.

Figure 4:
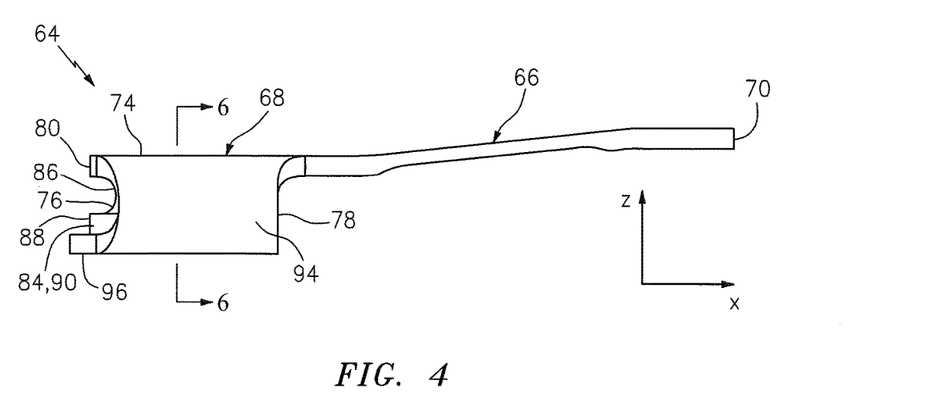
FIG. 4 is an illustration of a side of the vane lever arm of FIG. 3.
Figure 5:
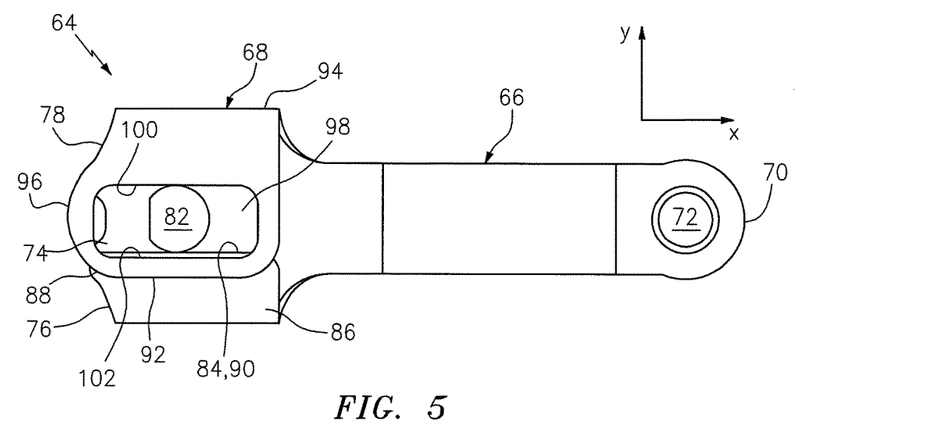
FIG. 5 is an illustration of another side of the vane lever arm of FIG. 3.
Figure 6:
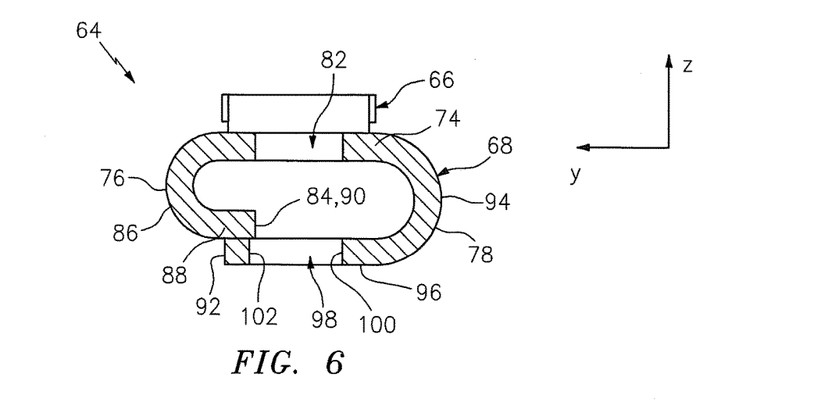
FIG. 6 is a sectional illustration of the vane lever arm of FIG. 4.

The mount portion 68 includes a mount base 74, a mount first tab 76 and a mount second tab 78. The base 74 extends longitudinally from the arm portion 66 to a distal base end 80. The base 74 is arranged and extends laterally (e.g., along a radial y axis) between the first tab 76 and the second tab 78. The base 74 includes an aperture 82, which may be laterally aligned with the aperture 72.

The first tab 76 extends from the base 74 to a distal first tab end 84. The first tab 76, for example, includes an intermediate portion 86 and an end portion 88. The intermediate portion 86 extends (e.g., along a z axis) from the base 74 to the end portion 88. The intermediate portion 86 has an arcuate (e.g., semi-annular) cross-sectional geometry. The end portion 88 extends laterally from the intermediate portion 86 to the first tab end 84, and laterally overlaps the base 74. The end portion 88 includes an anti-rotation element 90, and may have a substantially planar cross-sectional geometry. The anti-rotation element 90 is arranged at the first tab end 84. In the embodiment of FIGS. 4 to 6, the anti-rotation element 90 is configured as a substantially planar surface.

The second tab 78 extends from the base 74 to a distal second tab end 92. The second tab 78, for example, includes an intermediate portion 94 and an end portion 96. The intermediate portion 94 extends from the base 74 to the end portion 96. The intermediate portion 94 has an arcuate (e.g., semi-annular) cross-sectional geometry. The end portion 96 extends laterally from the intermediate portion 94 to the second tab end 92, and laterally overlaps the base 74 and the end portion 88. The end portion 96 includes an aperture 98 and one or more anti-rotation elements 100 and 102, and may have a substantially planar cross-sectional geometry. The aperture 98 may have an elongated cross-sectional geometry; e.g., the aperture 98 has a lateral width and a longitudinal length that is greater than the width. The aperture 98 may be coaxial with the aperture 82, and may be laterally overlapped by the end portion 88. The anti-rotation elements 100 and 102 partially define opposing sides of the aperture 98, where the anti-rotation element 100 laterally faces the anti-rotation element 90. In the embodiment of FIGS. 4 to 6, the anti-rotation elements 100 and 102 are configured as substantially planar surfaces.

Figure 7:
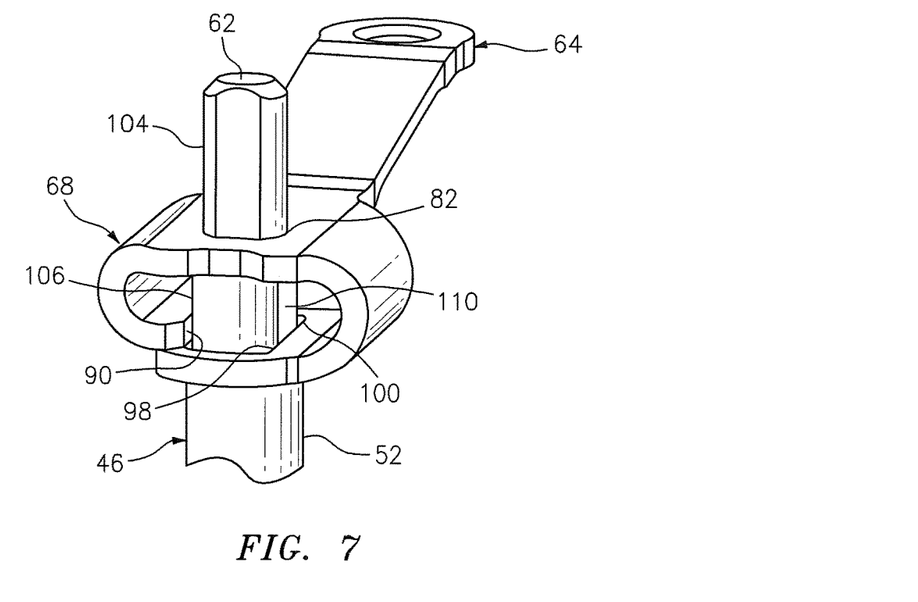
FIG. 7 is a partial, perspective illustration of the vane lever arm and the adjustable stator vane of FIG. 3.
Figure 8:
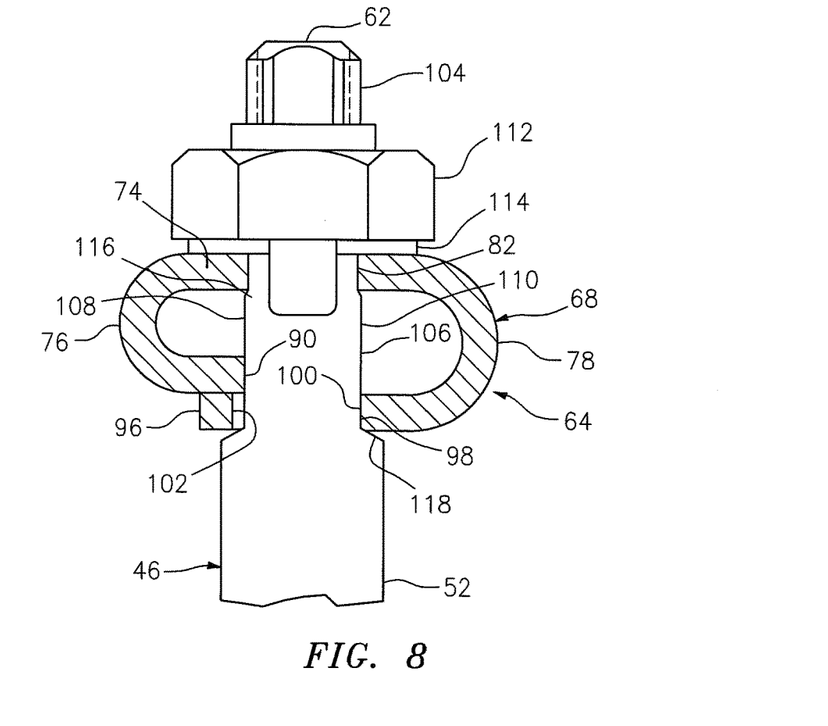
FIG. 8 is a partial, end cutaway illustration of the vane lever arm and the adjustable stator vane of FIG. 3.

Referring to FIGS. 7 and 8, the mount portion 68 is connected to the outer shaft 52 at the outer vane end 62. A threaded end portion 104 of the outer shaft 52 extends through the aperture 82. Both this end portion 104 and the aperture 82 may have (e.g., D-shaped) cross-sectional geometries to ensure the vane lever arm 64 is properly orientated relative to the stator vane 46. An intermediate portion 106 of the outer shaft 52 extends through the aperture 98. This intermediate portion 106 is located laterally between the anti-rotation element 90 and the anti-rotation element 100 as well as laterally between the anti-rotation element 100 and the anti-rotation element 102. Anti-rotation elements 108 and 110 (e.g., substantially planar surfaces) of the intermediate portion 106 respectively engage (e.g., contact) the anti-rotation elements 90 and 100. A nut 112 and lock washer 114 are mated with the end portion 104, which connects the base 74 to the outer shaft 52 against a shoulder 116. The end portion 96 is arranged adjacent to and may engage a shoulder 118.

Referring to FIG. 8, the vane lever arm 64 is adapted to operate in a plurality of different modes of operation including a first mode of operation and a second mode of operation. The vane lever arm 64 may operate in the first mode of operation, for example, during nominal flight conditions. The vane lever arm 64 may operate in the second mode of operation, for example, during non-nominal flight conditions; e.g., where the stator vane 46 is subject to a surge force caused by a foreign object such as a bird, or a blade out. During the first mode of operation, the engagement between anti-rotation elements 90 and 108 and/or the engagement between the anti-rotation elements 100 and 110 may prevent the vane lever arm 64 from rotating relating to the outer shaft 52. The anti-rotation elements 102 and 108 may be laterally separated by a gap. In contrast, during the second mode of operation, an additional force applied to the stator vane 46 (e.g., a surge force) may cause the outer shaft 52 to slightly rotate relative to the vane lever arm 64 and (e.g., elastically) splay the first and the second tabs 76 and 78 apart. As the first and the second tabs 76 and 78 splay apart, however, the anti-rotation element 102 may engage the anti-rotation element 108, which may prevent further splaying of the tabs 76 and 78. This engagement between the anti-rotation elements 102 and 108 and/or the engagement between the anti-rotation elements 90 and 108 may prevent additional rotation between the vane lever arm 64 and the outer shaft 52.

The mount portion 68 may have various configurations other than that described above and illustrated in the drawings. The first tab 76, for example, may overlap the second tab 78 such that the end portion 96 is arranged axially between the base 74 and the end portion 88. The anti-rotation elements 90 and 102 may be laterally aligned. The intermediate portions 86 and 94 may have non-curved geometries; e.g., the intermediate portions may be perpendicular to the base and/or the respective end portions. The present invention, therefore, is not limited to any particular vane mount configurations.

Figure 9:
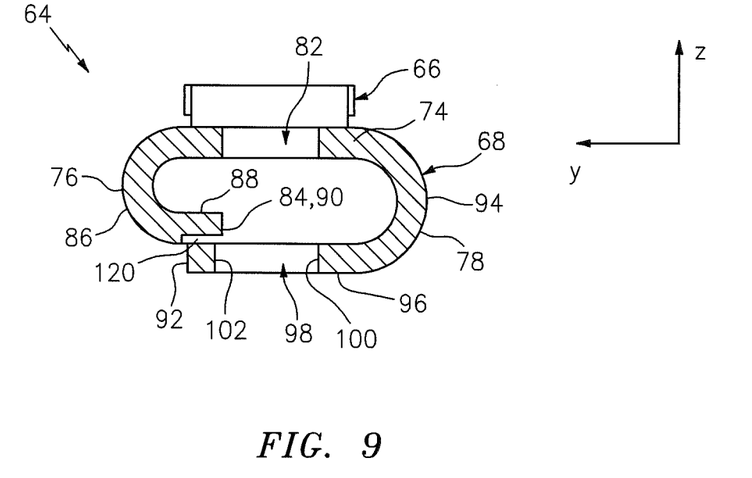
FIG. 9 is a sectional illustration of an alternate embodiment vane lever arm.

In some embodiments, for example as illustrated in FIGS. 4 to 6, the vane lever arm 64 may have a unitary body. The vane lever arm 64, for example, may be formed from a sheet of metal such that the mount portion 68 and the arm portion 66 are integral with one another. In one such embodiment, for example as illustrated in FIG. 9, the end portion 88 may include a notch 120 that provides room for forming the second tab 78. The present invention, however, is not limited to any particular vane lever arm configurations, materials and/or manufacturing processes.

The terms "forward", "aft", "inner" and "outer" are used to orientate the components of the variable area vane arrangement described above relative to the turbine engine and its axis. A person of skill in the art will recognize, however, one or more of these components may be utilized in other orientations than those described above. The present invention therefore is not limited to any particular variable area vane arrangement spatial orientations.

A person of skill in the art will recognize the variable area vane arrangement may be included in various turbine engines other than the turbine engine described above and illustrated in the drawings. A person of skill in the art will also recognize the variable area vane arrangement may be included in various types of rotational equipment other than a turbine engine. The present invention therefore is not limited to any particular types or configurations of rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A variable area vane arrangement, comprising:
   a stator vane including a shaft having an axis; and
   a vane lever arm that rotates the stator vane about the axis, and includes a base, a first tab and a second tab, wherein
      the base is arranged laterally between the first tab and the second tab;
      the first tab laterally overlaps the base; and
      the second tab includes an aperture and laterally overlaps the base and the first tab;
   wherein the shaft extends through the aperture and is connected to the base;
   wherein the first tab extends from the base to a first anti-rotation element;
   wherein the second tab includes a second anti-rotation element that partially defines the aperture;
   wherein the shaft is arranged between and engages the first anti-rotation element and the second anti-rotation element;
   wherein the second tab includes a third anti-rotation element that partially defines the aperture;
   wherein the third anti-rotation element is separated from the shaft by a gap during a first mode of operation, and engages the shaft during a second mode of operation; and
   wherein the shaft is arranged between the second anti-rotation element and the third anti-rotation element.

2. The vane arrangement of claim 1, wherein the vane lever arm further includes an arm portion that extends longitudinally from the base.

3. The vane arrangement of claim 1, wherein the first tab is located adjacent the shaft.

4. The vane arrangement of claim 1, wherein the first tab overlaps the aperture.

5. The vane arrangement of claim 1, wherein the first anti-rotation element is configured as a substantially planar surface that contacts a substantially planar surface of the shaft.

6. The vane arrangement of claim 1, wherein the second anti-rotation element is configured as a substantially planar surface that contacts a substantially planar surface of the shaft.

7. The vane arrangement of claim 1, wherein at least one of the first tab and the second tab each include an intermediate portion and an end portion;

the intermediate portion extends between the base and the end portion; and the end portion overlaps the base.

8. The vane arrangement of claim 7, wherein the intermediate portion is curved, and the end portion is substantially planar.

9. The vane arrangement of claim 1, wherein the base includes a second aperture, and the shaft extends through the second aperture.

10. The vane arrangement of claim 1, further comprising a vane platform including a second aperture, wherein the stator vane further includes a turbine engine airfoil, and wherein the shaft extends from the airfoil, through the second aperture, to the vane lever arm.

11. A variable area vane arrangement, comprising:

a stator vane including a shaft having an axis; and a vane lever arm that rotates the stator vane about the axis, and includes a base, a first tab and a second tab, wherein the base is arranged between the first tab and the second tab;

the first tab extends from the base to a first anti-rotation element; and the second tab includes an aperture and a second anti-rotation element that partially defines the aperture;

wherein the shaft extends through the aperture, is connected to the base, and is arranged between the first anti-rotation element and the second anti-rotation element;

wherein the second tab includes a third anti-rotation element that partially defines the aperture;

wherein the third anti-rotation element is separated from the shaft by a gap during a first mode of operation, and engages the shaft during a second mode of operation; and wherein the shaft is arranged between the second anti-rotation element and the third anti-rotation element.

12. The vane arrangement of claim 11, wherein the first tab overlaps the base, and the second tab overlaps the base and the first tab.

13. The vane arrangement of claim 12, wherein the first tab overlaps the aperture.

14. The vane arrangement of claim 11, wherein at least one of the first tab and the second tab each include an intermediate portion and an end portion;

the intermediate portion extends between the base and the end portion; and the end portion overlaps the base.

15. The vane arrangement of claim 11, further comprising a vane platform including a second aperture, wherein the stator vane further includes a turbine engine airfoil, and wherein the shaft extends from the airfoil, through the second aperture, to the vane lever arm.

16. A variable area vane arrangement, comprising:

a stator vane including a shaft; and a vane lever arm configured to rotate the stator vane about an axis of the shaft, the vane lever arm including an arm portion, a base, a first tab and a second tab;

the arm portion projecting out from the base and away from the shaft;

the base extending and connected laterally between the first tab and the second tab;

the first tab connected to the arm portion through the base independent of the second tab, and the first tab laterally overlapping the base;

the second tab connected to the arm portion through the base independent of the first tab, and the second tab including an aperture and laterally overlapping the base and the first tab;

wherein the shaft extends through the aperture and is connected to the base.

17. The vane arrangement of claim 16, wherein the first tab extends from the base to a first anti-rotation element;

the second tab includes a second anti-rotation element that partially defines the aperture; and the shaft is arranged between and engages the first anti-rotation element and the second anti-rotation element.

18. The vane arrangement of claim 17, wherein the second tab includes a third anti-rotation element that partially defines the aperture;

the third anti-rotation element is separated from the shaft by a gap during a first mode of operation, and engages the shaft during a second mode of operation; and the shaft is arranged between the second anti-rotation element and the third anti-rotation element.

* * * * *